United States Patent [19]

Gleason et al.

[11] Patent Number: 4,971,562
[45] Date of Patent: Nov. 20, 1990

[54] DIDACTIC DEVICE TO AID IN UNDERSTANDING AND TEACHING ABOUT ELECTROMAGNETIC FIELDS AND THEIR EFFECTS

[76] Inventors: Warren J. Gleason, 106 W. Oneida St.; Cecil W. LeFevre, 150 W. Oneida St., both of Preston, Id. 83263

[21] Appl. No.: 529,137
[22] Filed: May 25, 1990
[51] Int. Cl.⁵ .......................................... G09B 23/18
[52] U.S. Cl. ................................... 434/301; 434/300
[58] Field of Search ....................... 434/314, 301, 300

[56] References Cited

U.S. PATENT DOCUMENTS

| | | | |
|---|---|---|---|
| 2,700,831 | 2/1955 | Mathiesen | 434/301 |
| 3,663,731 | 5/1972 | Ofwerstrom | 434/301 |
| 4,267,647 | 5/1981 | Anderson | 434/301 |
| 4,404,766 | 9/1983 | Toth | 434/301 |

FOREIGN PATENT DOCUMENTS

2630567 10/1989 France ............................ 434/300

Primary Examiner—V. Millin
Assistant Examiner—Phil Kubel
Attorney, Agent, or Firm—Seed and Berry

[57] ABSTRACT

According to principles of the invention, an educational device is provided for investigating and teaching about electromagnetic fields. The device includes a pair of toroid magnets each having a north pole and a south pole. As is known, a toroid magnet is generally doughnut-shaped with a hole in the middle; one side is north, the other south. The toroid magnets are held together by a magnet support member. The magnets are positioned with their holes aligned to form a common passageway. Like magnetic poles face each other so that the magnets of the pair repel each other. An electrically conductive, metallic, L-shaped rod extends through the common passageway formed by both holes of the pair of toroid magnets. A rod support member is coupled to the base of the rod in a manner to permit the rod to pivot about its base. When the L-shaped rod is suspended in a stationary position and an electromagnetic field is brought sufficiently adjacent the rod to interact with the magnetic field of the rod, the rod deflects based on the position, strength, orientation, field, and other features of the electromagnetic field. A student is thus able to study magnetic fields, electromagnetic forces, and their interaction through use of this device. The device is simple to construct and simple to operate so that it is an excellent tool to provide hands-on experience to aid in understanding electromagnetic forces in nature.

14 Claims, 9 Drawing Sheets

Figure 11b
Prior Art

DIDACTIC DEVICE TO AID IN UNDERSTANDING AND TEACHING ABOUT ELECTROMAGNETIC FIELDS AND THEIR EFFECTS

TECHNICAL FIELD

This invention relates to educational devices, and more particularly, to a device and method to aid in studying and understanding electromagnetic fields in nature and man-made structures.

BACKGROUND OF THE INVENTION

The existence of electromagnetic fields around a conductor is well known. Early work in studying the relationship between an electric current and a magnetic field established that a compass needle was deflected when placed near a conductor carrying an electric current. Through various experiments, AndréMarie Ampere determined the shape of the magnetic field about a conductor carrying current.

The interaction between magnetic fields and conductors forms the basis for the generation of electricity today. Large power generators produce electricity by conductive wires being rotated within magnetic fields. Motors, solenoids, transformers, and many other electric devices rely on the relationship between conductors and magnetic fields to operate. A galvanometer is a sensitive instrument for detecting feeble currents which relies on the interaction between two magnetic fields, one induced by an electric field and the other emanating from a permanent magnetic.

Yet the problem remains as to how to teach this interaction to students as they begin to explore the world of physics. Seeing an electric motor spin does not teach the student about the shape of, and interaction between, electromagnetic fields. Few students have the skills or equipment to build their own testing devices, such as solenoids, miniature electric motors, galvanometers or the like. If the student is not mechanically skilled in building an experimental device, it may not operate properly and thus will fail to teach the desired lesson. In a classroom, the student may not understand the interaction of forces because he does not receive any hands on experience. Often the student and teacher alike are helped by conducting experiments with simple tools to begin their study toward understanding the interaction of various forces in nature. Simple tools are needed that will aid a person in the study of electric current, electric and magnetic fields, the interaction of electromagnetic fields, and various forces as they exist in nature or as made by man.

SUMMARY OF THE INVENTION

According to principles of the invention, an educational device is provided for investigating and teaching about electromagnetic fields. The device includes a pair of toroid magnets each having a north pole and a south pole. As is known, a toroid magnet is generally doughnut-shaped with a hole in the middle; one side is north, the other south. The toroid magnets are held together by a magnet support member. The magnets are positioned with their holes aligned to form a common passageway. Like magnetic poles face each other so that the magnets of the pair repel each other. The magnet support member retains the magnets sufficiently close to each other that the repelling force distorts their respective magnetic fields. An electrically conductive, metallic, L-shaped rod extends through the common passageway formed by both holes of the pair of toroid magnets. The metallic, L-shaped rod includes a base portion, an elongated body portion and an elbow portion between the base portion and the body portion. The base portion extends through the holes of the toroid magnets and the body portion extends at approximately a right angle from the base. A rod support member is coupled to the base of the rod in a manner to permit the rod to pivot about its base.

The magnetic lines of force extending from the pair of toroid magnets are modified by the L-shaped rod. The rod is suspended in the air with the base portion generally perpendicular to the force of gravity. The rod may be suspended from the ceiling by connecting the rod support member to the ceiling with a string. Alternatively, the rod may be supported from a frame member or by being held in the hand of a student. When the L-shaped rod is suspended in a stationary position and an electromagnetic field is brought sufficiently adjacent the rod to interact with the magnetic field of the rod, the rod deflects based on the position, strength, orientation, field, and other features of the electromagnetic field. For example, if the rod is suspended from the ceiling and a magnet such as a horseshoe magnet or a bar magnet, is brought adjacent the rod, the rod deflects in a direction based upon the orientation and position of the magnet. Similarly, if the L-shaped rod is moved with respect to an electrical conductor, such as by moving it below a high-voltage power line, the rod deflects based on the relative position, direction of electromagnetic field lines and the like as it is moved through the electromagnetic field associated with the conductor.

A student is thus able to study magnetic fields, electromagnetic forces, and their interaction through use of this device. The device is simple to construct and simple to operate so that it is an excellent tool to provide hands-on experience to aid in understanding electromagnetic forces in nature.

BRIEF DESCRIPTION OF THE DRAWINGS

FIG. 4 is a side elevational view of a magnetic field as modified by opposing magnets, as is known in the prior art.

FIG. 7b is a side elevation of the embodiment of FIG. 7a.

DETAILED DESCRIPTION OF THE INVENTION

Figure 1A:
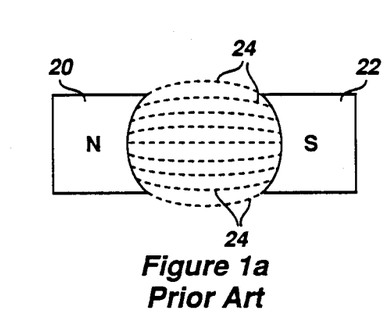
FIG. 1a is a side elevation of magnetic lines of force between north and south poles of a magnet as is known in the prior art.
Figure 1B:
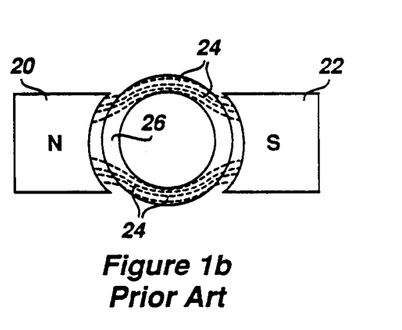
FIG. 1b is a side elevation of the magnetic lines of force of FIG. 1a as modified by an iron member in the field as is known in the prior art.

FIGS. 1a and 1b illustrate the magnetic flux across an air gap and the modification of that flux by a ferromagnetic member. A magnetic north pole 20 and a south pole 22 have a plurality of magnetic flux lines 24 extending therebetween. In FIG. 1a, the material between the magnetic poles 20 and 22 is air. It is known that various materials modify the flux density and magnetic field pattern. The field also becomes more dense within the ferromagnetic material than it is in air. The property of the material by which it changes the flux density in a magnetic field from the value of that field in air is called its permeability. The permeability of air is defined as unity. The permeability of some magnetic substances is less than 1, while the permeability of other substances is greater than 1. Permeability is a ratio of flux density and therefore is without dimension. As illustrated in FIG. 1b, if a soft iron ring is positioned between the north pole 20 and south pole 22 of a magnetic, the magnetic flux follows the soft iron ring 26, which is more permeable to magnetic fields than air. The field is much more dense within the ring 26 than it was in air, resulting in a concentration of the magnetic field.

Figure 2A:
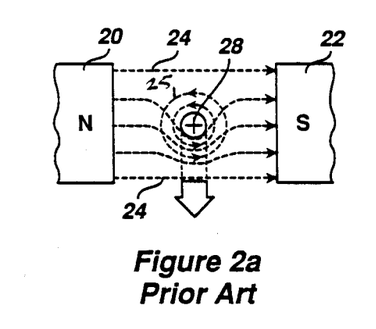
FIGS. 2a and 2b are side elevation views of the magnetic lines of force being affected by an electrical conductor being moved in the selected direction as is known in the prior art.
Figure 2B:
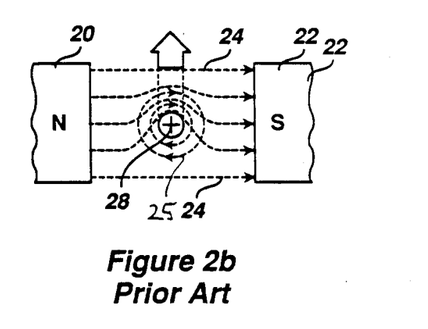

As illustrated in FIGS. 2a and 2b, the magnetic flux lines 24 are also affected by an induced current in wire 28 moving through or positioned within the magnetic flux 24. Moving a wire 28 through a magnetic field induces a current, in this instance, into the page. The induced current produces its own magnetic field, as discovered by Ampere. The magnetic field 24 of magnets 20 and 22 interacts with the magnetic field 25 of the current in wire 28, a magnetic field 25 which the main magnetic field 24 created by creating the induced current in the wire 28. As shown in FIG. 2a, the flux lines 24 bend around the wire 28 where the two fields are in the same direction and the total flux is increased. The magnetic field is stronger in the region into which the conductor is moving, thus the direction of the induced current acts to weaken the field behind it and strengthen the field ahead of it. This results in an imbalanced force which acts on the induced current in the wire 28 in opposition to its motion. FIG. 2b illustrates a similar force which opposes the reverse motion of the wire 28.

The significant relationship between an induced current and the magnetic field inducing it was first recognized in 1834 by German physicist Heinrich Friedrich Emil Lenz, who introduced Lenz's law concerning induced currents. Lenz's law may be stated as follows: "Whenever there is an induced electromotive force (emf) in a conductor, it is always in such a direction that the current it would produce would oppose the change which causes the induced emf." Lenz's law is another example of the principle of the conservation of energy so prominent in the study of modern physics. Work must be done to induce a current in a conducting circuit, and the energy expended comes from outside the system. The induced current can produce heat or do mechanical or chemical work in the external circuit.

A simple generator can be constructed according to these principles. An EMF is induced in a conductor whenever it experiences a change in magnetic flux linkage. When the conductor is part of a closed circuit passing through a magnetic field, an induced current is generated in the circuit. The work done to induce a current in a conducting circuit, such as a stream of water turning a turbine, generates electrical energy.

Similarly, electrical energy is converted to mechanical motion in a motor. An electric motor performs the reverse function of a generator. Electric energy is converted to mechanical engineering using the same electromagnetic principles employed in a generator, and illustrated in FIGS. 2a and 2b. Large and complex electric generators and motors are constructed according to these principles. Many devices we use in our daily life operate on these principles.

Unfortunately, it is often difficult for a student to understand the basic theory of operation behind electric generators, electric motors, and the like. Because the devices are generally complex and difficult to construct with precision, a student rarely has an opportunity to experiment with the relationships between electromagnetic fields, conductors, and induced fields. A simple, yet functional, "hands on" device is needed to facilitate a student's study of these relationships.

Figure 3:
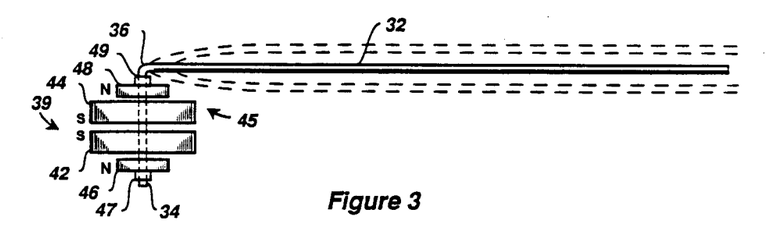
FIG. 3 is a side elevation of a structure embodying the principles of the invention.

FIG. 3 illustrates a testing device 29 which permits a student to conduct various experiments with magnetic, electromagnetic, and induced fields. The device 29 includes an L-shaped rod 30 having a body portion 32, a base portion 34, and an elbow region 36. The base portion 34 is coupled to the body portion 32 at the elbow region 36. The base portion 34 is approximately perpendicular to the body portion 32, the elbow 36 being a right angle. The body portion is preferably 10"-12"long, though it may be any selected length. The rod 30 is a metallic rod and an electrical conductor. In one embodiment, the rod 30 is made of a relatively soft iron. In other embodiments it is steel, nickel, iron, copper, brass or some other electrical conductor. The rod 30 may also be a long, cylindrical permanent magnet or electromagnet if desired.

The rod 30 is retained in a support member 39. Support member 39 includes magnets 42 and 44, magnet support member 45 and rod support member 47. The pair of toroid magnets 42 and 44 are held adjacent each other with their repelling poles facing the magnetic support member 45. A toroid magnet is a doughnut shaped magnet, having a hole through the center; one side is a magnetic north pole and the other side is a magnetic south pole. The toroid magnets 42 and 44 are retained with like pole members facing each other, so that the magnets repel each other. In the example of FIG. 3, the two south poles of the magnet are positioned facing each other and the north poles face outward. Alternatively, the north poles could be positioned facing each other. Toroid magnets commercially available are suitable for use as magnets 42 and 44. Magnets approximately 1½ to 2"in diameter have been found suitable for use with this invention.

The magnet support member 45 includes a lower retaining member 46, an upper retaining member 48, and a rod 49 to which they are coupled. The two magnet retaining members 46 and 48 preferably hold the magnets closely adjacent each other, and in one embodiment actually touching, to ensure that there is a strong repelling force between the two toroid magnets 42 and 44 and therefore a significant distortion of their respective magnetic fields. The magnetic support member 45 including members 47 and 48 may be constructed from any suitable non-magnetic material, such as plastic, wood, aluminum, brass or the like. In one embodiment, they are springloaded brass discs coupled to central support rod 49 that functions both as a part of the magnetic support member 45 and the rod support member 47. The support member 45 is nonmagnetic so that it will not affect the fields from the magnets 42 and 44 and permits the field to conform to the rod 30. The rod support member 47 retains the base portion 34 of the rod 30 within a common passageway formed by the aligned holes of the pair of toroid magnets 42 and 44. The rod support member 47 includes a brass, hollow cylinder 49 extending through the center holes of the toroid magnets 42 and 44. The base portion 34 and part of the elbow portion 36 contact the cylinder 49 on a smooth surface to permit smooth and low friction rotation of the base portion 34 about its own axis. The body portion 32 may thus easily be deflected, by even a small force, to point in a specific direction. In one embodiment (see FIG. 7b), the rod support member 30 includes a sleeve 57 around the base 34 of the rod to ensure that it does not fall out of the cylinder 49 if it is turned upside down.

Figure 4:
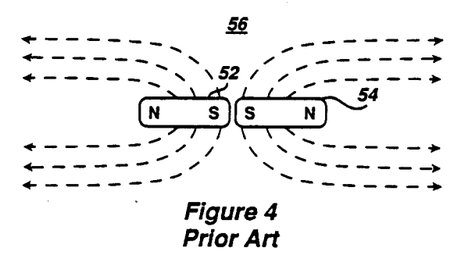
FIG. 4 illustrates the magnetic lines of force of opposing magnets.

FIG. 4 illustrates the modification of the electromagnetic lines of force of two magnets 52 and 54 having like poles brought together. The repulsion effect of the magnetic poles modifies the magnetic flux lines to extend away from each other.

Figure 5:
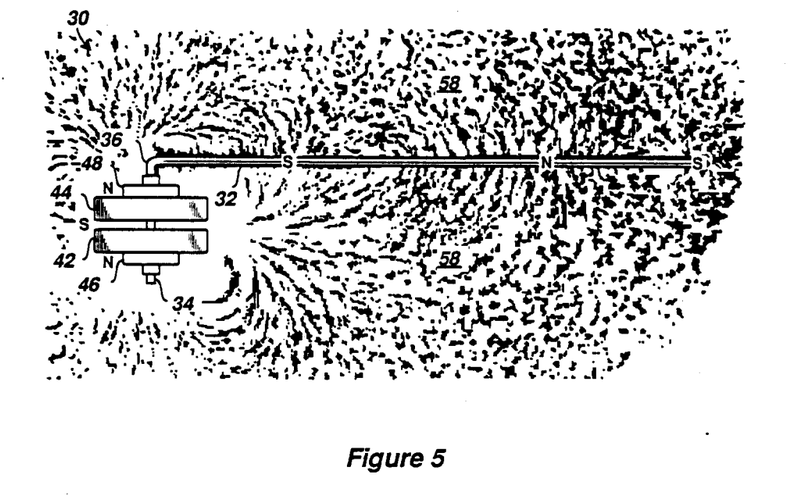
FIG. 5 is a side elevational view of iron filings adjacent the structure according to the invention.

FIG. 5 illustrates the magnetic lines of force on a device constructed according to principles of the invention. Iron filings 58 are sprinkled around the L-shaped rod 30 and toroid magnets 42 and 44 to illustrate the modification effect of the magnetic lines of force. As is illustrated in FIG. 5, the south poles of magnets 42 and 44 are facing each other and thus modify the respective magnetic flux lines, forcing them away from each other. The magnetic flux lines extend outward from each of the north pole ends of the toroid magnets 42 and 44. The body member 32 modifies the extending magnetic lines of force in a manner similar to that illustrated by the prior art of FIG. 1b. That is, the body member 32 extending through the magnetic flux lines modifies their path to conform to, and flow through, rod 30 rather than the surrounding air. The body portion 32 thus contains many magnetic flux lines at a higher density than the surrounding air. Placing the magnets with like poles facing each other causes the magnetic flux lines to extend outward along and within the body member 32.

Figure 6:
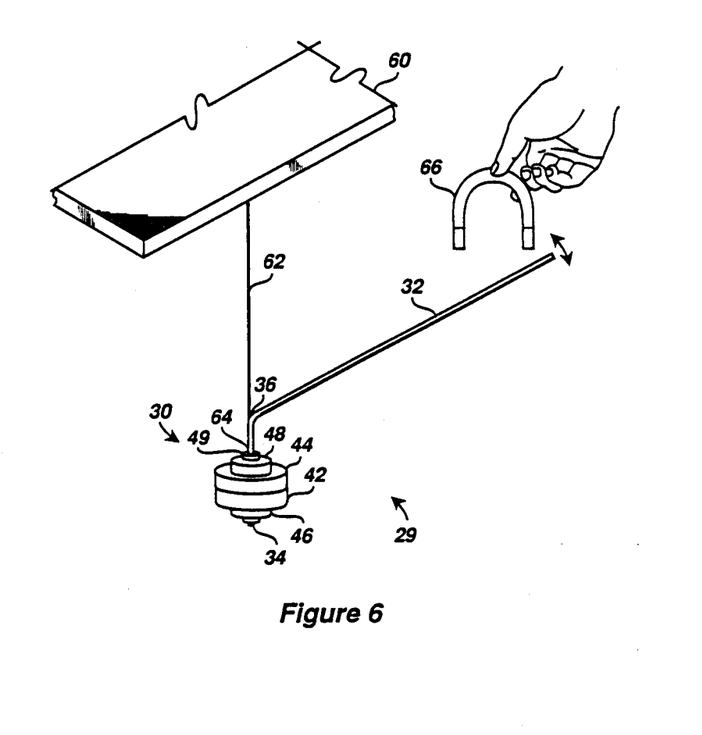
FIG. 6 is an isometric view of the L-shaped rod suspended by a string from a support member.

FIG. 6 illustrates the testing device 29 having L-shaped rod 30 suspended from a support member 60 by string 62. The string 62 is coupled at a point 64 near the center of gravity of the testing device 29 to ensure that the base 34 is generally perpendicular to the force of gravity and the body portion 32 can freely pivot about base member 34. With the testing device 29 so suspended, it may rest for several hours or days without movement, unless affected by an outside force. If a student desires to study the electromagnetic properties of various objects, induced currents or other forces in nature, he may bring them adjacent the L-shaped rod 30. For example, a student may hold a magnet 66 in his hand and move the magnet 66 in a region generally adjacent the L-shaped rod 30. The L-shaped rod 30 will pivot about the axis of base 34 in response to a magnet 66 being brought in the general region of the body member 32. The direction of rotation, as well as the speed and force with which the body member 32 pivots is determined by several factors, including, the strength of the magnet 66 held by the student, the position of the magnet 66 with respect to the body member 32, the pole orientation of the magnet, its relative position along the rod member 32, the type of material of the rod, whether iron, copper, steel, etc., and many other factors.

The rod 30 is sufficiently sensitive to outside forces and rotates with sufficiently low friction that it pivots even though the magnet 66 may be spaced some distance from rod 30. The rod pivots based on the interaction, whether by attraction or repulsion, of their respective magnetic fields. The magnet 66 must therefore be sufficiently close that their fields interact. This distance will vary based on the strengths of magnets 42, 44, and 66 and the material from which rod 30 is constructed. The student can spend significant time studying the direction of deflection as well as the speed and amount of displacement based on the orientation and relative position of magnet 66. While a horseshoe magnet 66 is illustrated, it will be understood that various types of magnets, such as bar magnets, toroids or the like may also be used by a student to experiment with the different magnetic fields associated with different types of magnets and the response of the L-shaped rod 30 to each. In addition, the student may use an electric current-carrying wire in place of magnet 66 to study the effect of the interaction between electromagnetic fields, induced fields and currents, and the like.

Figure 7A:
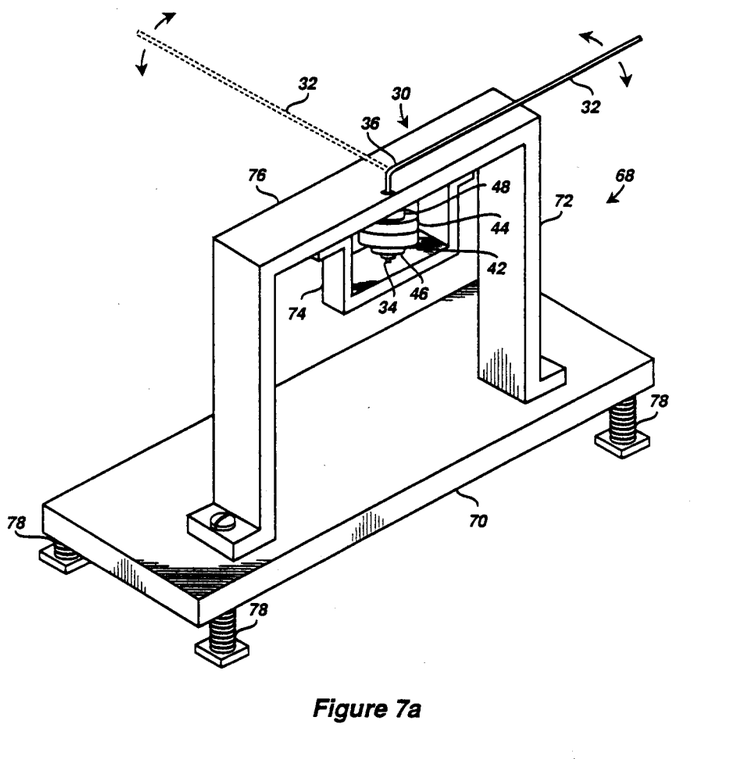
FIG. 7a is an isometric view of the L-shaped rod suspended from a frame.
Figure 7B:
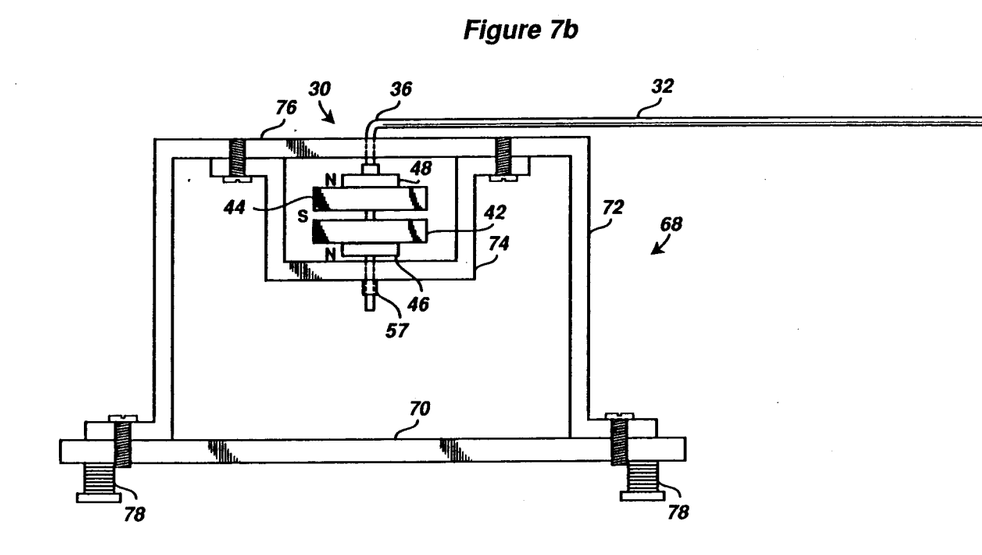

FIGS. 7a, 7b illustrate a ground-based suspension system 68 for suspending the device 29. The system 68 includes a base member 70 and a rod support member 72. The rod support member 72 includes arms 74 and 76 coupled to the rod support member 39. The base 70 may rest on the ground in a stable position. The base 70 may include adjustable height legs 78 to permit a user to level the L-shaped assembly perfectly if desired. The user may place an air-bubble level or some other instrument thereon to ensure that the body 70 is exactly level with respect to gravity. (A similar level-sensing device may be used on the assembly of FIG. 6.) The assembly 68 is ideally suited for use outside, whereas the assembly shown in FIG. 6 is ideally suited for use inside, or suspended from a tree outside. With the assembly 68 outside, the student may experiment with electromagnetic fields in nature. For example, the user may set the assembly 68 adjacent a high-voltage power line to observe the effect on the L-shaped rod assembly 30. As shown in FIG. 7a and previously described with respect to FIG. 6, when the rod 30 is within a field that interacts with the magnetic field associated with the rod 30, the rod 30 will be deflected in a direction based on that interaction.

The assemblies of FIGS. 6, 7a and 7b are ideally suited for tests that do not permit human interaction to influence the rotation of the rod 30. The rod 30 is held in a suspended position and is not touched by the student while performing the tests. Any rotation of the rod 30 is thus due to outside forces, such as the interaction of respective fields. All of support assembly 68 is preferably constructed on non-magnetic materials, even the screws in one embodiment, to ensure that the magnetic field associated with the rod 30 is not altered by unknown factors.

Figure 8:
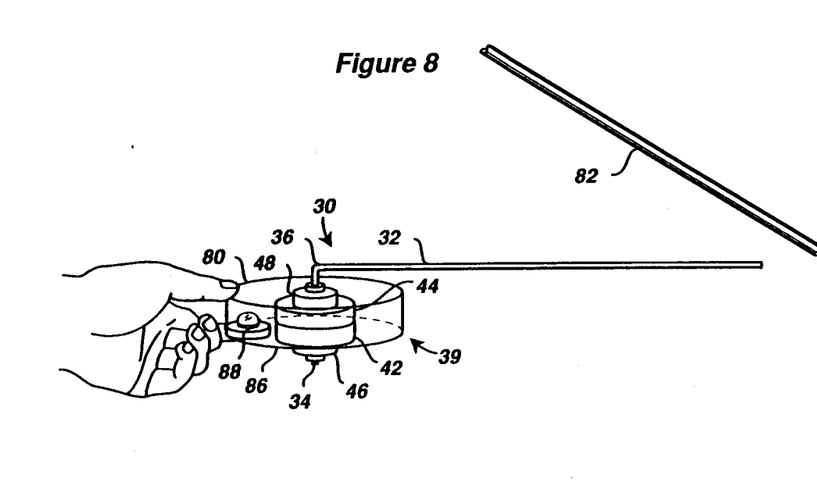
FIG. 8 is an isometric view of the L-shaped rod held in the hand of a student.

FIG. 8 illustrates a portable assembly for the L-shaped rod 30. A hand-supportable member 80 is coupled to the rod support member 39 to be held in the hand of a user. The user may carry the L-shaped rod assembly 30 to various locations to observe the interaction of electromagnetic fields. For example, the user may hold the L-shaped rod assembly 30 approximately level and walk underneath high-voltage power lines 82 to observe the effect on the L-shaped rod 30. As the magnetic field lines on the body portion 32 interact with the electromagnetic field lines associated with current flowing in a high voltage line 82, the L-shaped rod 30 will pivot about the base 34, causing the body portion 32 to deflect in one direction or another. A bulls-eye level 88 is coupled to the support base 86. A user is able to view the floating dot in the bulls-eye level 88 to monitor the tilt of the instrument and hold it exactly level relative to the force of gravity as he walks. The student can observe first hand the effects of a high-voltage power line on the magnetic field within the body portion 32. For increased sensitivity, body portion 32 may be elongated somewhat, or the strengths of magnets 42 and 44 increased or both.

The student is able to observe that electromagnetic lines exist directly below high voltage power lines, even though he may not be able to feel or see the effect in other objects. If the high-voltage line is of sufficiently high power and high-voltage, or relatively close to the ground, such as at a high voltage substation, the student may actually feel the effects of the field from the induced current on his body such as a pricking of the skin, or hairs on his neck standing on end or the like. If the power in the line is sufficiently low that the student is unable to feel it, he will still notice a deflection in the body portion 32 of the L-shaped rod assembly 30 based on the interaction of their respective fields. The student may experiment with conductors 82 having different voltages and currents to aid him in understanding the relative strengths of fields and their relationship over distances.

A student is thus provided with a simple, easy-to-construct device which is nevertheless sensitive enough to permit the student to see deflection of a body portion 32 in magnetic or electromagnetic fields. The student is able to experiment with various different objects to understand the interaction of electromagnetic fields in nature.

Figure 9:
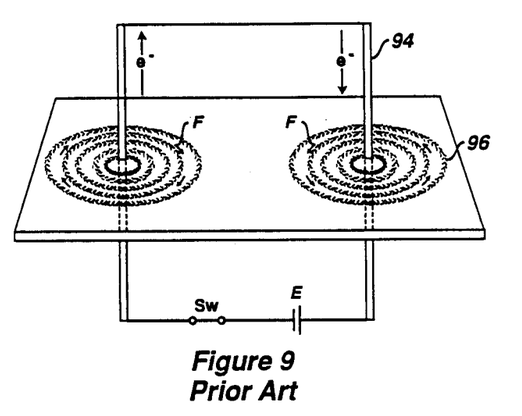
FIG. 9 is an isometric view of iron filings affected by the magnetic field lines of force according to experiments conducted in the prior art.

FIG. 9 illustrates the magnetic flux lines extending from current in a wire in a prior art experiment. As current passes through a wire 94 iron filings 96 adjacent to the wire align in a circular pattern based on the electromagnetic field associated with current flowing in wire 94. Ampere conducted experiments similar to that shown in FIG. 9 to determine the strength, relative position, and direction of various magnetic flux lines associated with current flowing in a wire. He concluded that the magnetic field encircles an electric charge in motion and that the lines of flux are closed concentric circles in a plane perpendicular to the conductor with the axis of the conductor as the center. The direction of the magnetic field is tangent to the flux and is dependent on the direction of the current. Ampere found that the strength of the magnetic field around a conductor carrying a current varies directly with the magnitude of the current and inversely with the distance from the conductor. He devised a rule, known as Ampere's Rule, or as the left-hand rule, for determining the direction of the magnetic field around a conductor in a straight conductor if the direction of the current is known. (As shown in FIGS. 2a and 2b, this magnetic field occurs even with an induced current, which creates a complex interaction of magnetic fields, induced currents and electromagnetic fields.)

A student is able to conduct experiments similar to that conducted by Ampere given the devices shown in FIGS. 3–9. That is, a device built according to the structure of FIGS. 3–8 permits a student to experiment with various fields, their interaction and relative strengths to aid him in gaining an understanding of electromagnetic forces in nature and the application of various principles studied many years ago. The student is not required to obtain expensive equipment, electric generators, messy magnetic or iron filings or the like in order to perform these experiments. Rather, the simple device of FIGS. 3–8 provides an educational tool for the student to study the interaction of electromagnetic fields in nature.

Figure 10A:
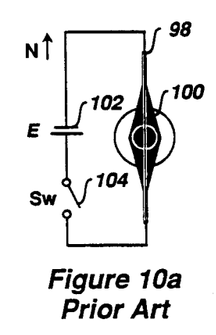
FIGS. 10a-10c are top plan views of a prior art experiment illustrating the interaction between an electromagnetic field and a magnetic field.
Figure 10B:
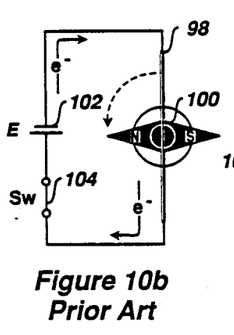
Figure 10C:
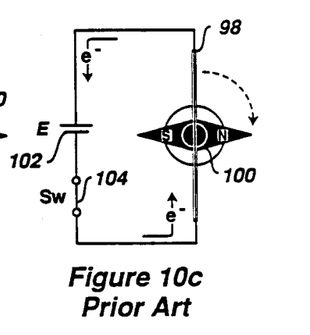

FIGS. 10a–10c and 11a–11b illustrate other prior art experiments the student may wish to simulate with the device 29. It has been found that a compass needle is deflected when brought near a conductor carrying an electric current. This experiment, performed by Danish physicist Hans Christian Oersted in 1819, was one of the first concrete experiments that proved a link between electricity and magnetism. As illustrated in FIG. 10a, if a compass needle 100 is placed below electric conductor 98 having no current flowing therethrough, the orientation of the needle 100 is not altered. (The wire is aligned pointing north, directly over the compass 100.) However, when a switch 104 is closed coupling power supply 102 to the conductor 98, current flows through the wire 98 and causes a deflection in the compass needle 100 The needle is rotated away from its previous orientation with the magnetic north pole and perpendicular to the wire 98. Similarly, if the polarity of the battery 102 is reversed such that the current flows the opposite direction in wire 98, the compass needle 100 is deflected in the opposite direction. Though this experiment was performed many years ago, it is still used as a teaching tool in some schools.

Figure 11A:
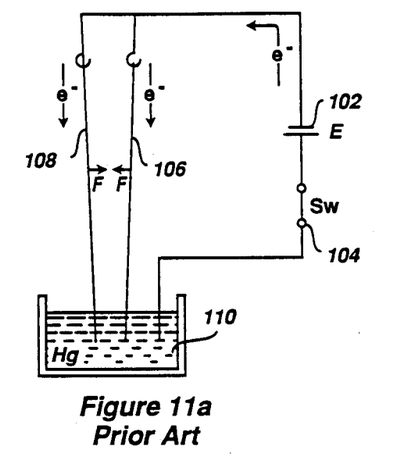
FIG. 11 is a schematic view of a prior art experiment illustrating the forces between parallel currents in the same direction and in the opposite direction.
Figure 11B:
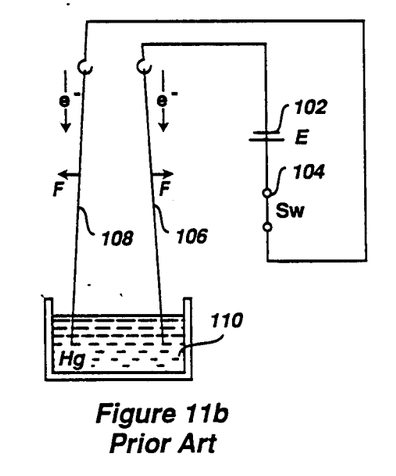

FIG. 11a and 11b, also previously conducted, illustrate similar principles. FIG. 11a illustrates two parable conductors 106 and 108 having current flowing therethrough in the same direction coupled to ground through a conductive fluid 110. An ideal conductive fluid is mercury. The switch 104 is coupled through a grounding wire 112 to cause the current to flow through both wires 106 and 108 in the same direction and out of the mercury 110 on the wire 112. However, if the grounding wire 112 is removed and the wires 106 and 108 are coupled together and the switch 104 closed, electric current must run in opposite directions through the respective wires. The two currents are in the opposite direction and the conductors repel each other as illustrated in FIG. 11b. (If the switch 104 is opened, the rods 108 and 106 neither repel nor attract, but hang straight down.)

The experiments of FIGS 11a–11b were first conducted many years ago when physicists were studying the interaction of electromagnetic fields. Unfortunately, these tools are rarely available to students desiring to study the interaction of electromagnetic fields today. Large tubs of mercury are not easily obtainable, and even if obtainable, the poisonous nature of mercury and mercury vapor are now sufficiently well known that mercury is not a preferred substance for handling by students. Though the experiments of FIGS. 11a–12b appear to be simple, the relationships between the parts and setting them up can be complex and difficult, preventing students from having the ability to experiment with the interaction of electromagnetic fields. This invention provides a simple, yet easy to use device to permit the student to experiment with the interaction of various electromagnetic fields.

We claim:

1. An educational apparatus for investigating magnetic fields and electromagnetic radiation comprising:
   an electrically conductive, metal L-shaped rod, said rod having a base portion, an elongated body portion, and an elbow portion between said base portion and said body portion, said elbow portion forming approximately a right angle between said base portion and said body portion;
   a pair of toroid magnets, each toroid magnet having a hole through its center and a magnetic north pole and a magnetic south pole;
   a non-magnetic support member retaining said magnets, said support member retaining said magnets adjacent each other with their holes aligned to form a common passageway having like magnetic poles facing each other so that said magnets within said pair magnetically repel each other and said non-magnetic support member retains said magnets sufficiently close to each other that a repelling force exists between them to distort their magnetic fields;
   a rod support member coupled to the base of said rod and retaining said base portion of said rod within said common passageway formed by said pair of toroid magnets, said rod support member including a coupling which permits said rod to pivot about said base.

2. The apparatus according to claim 1 wherein said rod includes iron.

3. The apparatus according to claim 1 wherein said toroid magnets are in physical contact with each other to ensure interaction of their respective magnetic fields.

4. The apparatus according to claim 1, further including an electric conductor carrying an electric current, said conductor being positioned adjacent said L-shaped rod.

5. The apparatus according to claim 4, further including a motive member coupled to said rod support member, said motive member being adapted to move said L-shaped rod with respect to said electric conductor.

6. The apparatus according to claim 1, further including a magnet having a magnetic field, said magnet being positioned adjacent said L-shaped rod.

7. The apparatus according to claim 6, further including a motive member coupled to said rod support member, said motive member being adapted to move said L-shaped rod with respect to said electric conductor to place said L-shaped rod in different portions of the magnetic field of said magnet and to move it across the magnetic lines of force of said magnet.

8. The apparatus according to claim 1, further including a rod suspension member coupled to said rod support member, said rod suspension member extending from a fixed support and suspending said rod in the air spaced from said fixed support.

9. The apparatus according to claim 8 wherein said rod suspension member includes a non-electrically conductive string coupled to said rod support member at one end of the string and to a rigid, suspension support member at another end of the string such that said rod hangs by said string, being suspended in the air below said suspension support member.

10. The method according to claim 9 wherein said moving step includes moving a second electromagnetic field with respect to said rod while the base of said rod is retained in a generally stationary position.

11. The method according to claim 9 wherein said moving step includes moving said rod with respect to said second electromagnetic field.

12. The apparatus according to claim 8 wherein said rod suspension member includes a rigid frame coupled to the ground and supporting said rod above the ground a selected distance.

13. An educational apparatus for investigating magnetic fields and electromagnetic radiation comprising:
    an electrically conductive, metal L-shaped rod, said rod having a base portion, an elongated body portion, and an elbow portion between said base portion and said body portion, said elbow portion forming approximately a right angle between said base portion and said body portion;
    a source of electromagnetic radiation coupled to the base portion of said L-shaped rod;
    a rod support member coupled to the base of said rod and retaining said base portion of said rod in contact with said source of electromagnetic radiation, said support member including a coupling which permits rotation of said rod about said base.

14. A method of investigating magnetic fields and electromagnetic radiation comprising:
    retaining a pair of toroid magnets in an opposed magnetic relationship adjacent each other, each of said magnets having a hole through its center and a magnetic north side and a magnetic south side and retaining said magnets with their holes aligned to form a common passageway and having like magnetic sides facing each other so that said magnets within said pair magnetically repel each other and said magnets are sufficiently close to each other that a repelling force exists between them;
    supporting an electrically conductive, metal L-shaped rod through said common passageway to cause said magnetic fields from said pair of toroids to be associated with said rod, said rod having a base portion, an elongated body portion, and an elbow portion between said base portion and said body portion, said elbow portion forming approximately a right angle between said base portion and said body portion and said rod being supported to permit rotation about said base member;
    moving said rod with respect to a second electromagnetic field to deflect said rod as the magnetic field associated with said rod interacts with said second electromagnetic field.

* * * * *